United States Patent [19]
Horton et al.

[11] 4,205,794
[45] Jun. 3, 1980

[54] DESTRUCTIVE DEVICE

[76] Inventors: Jack E. Horton, P.O. Box 18011, San Antonio, Tex. 78218; Richard R. Kepler, 9707 Eveningway, San Antonio, Tex. 78233

[21] Appl. No.: 943,239

[22] Filed: Sep. 18, 1978

[51] Int. Cl.[2] .................... B02C 13/286; B02C 23/02; B65H 3/60; B65G 3/10

[52] U.S. Cl. .................................. 241/73; 241/186.2; 222/201; 221/203; 221/205

[58] Field of Search ...................... 241/73, 194, 186.2; 221/202, 203, 204, 205; 222/201

[56] References Cited

U.S. PATENT DOCUMENTS

| | | | |
|---|---|---|---|
| 664,477 | 12/1900 | Holtzclaw | 222/201 |
| 1,410,636 | 3/1922 | Williams | 241/186.2 |
| 1,798,685 | 3/1931 | Kurtenbach | 221/202 |
| 2,171,949 | 9/1939 | Roca et al. | 222/201 |
| 3,630,458 | 12/1971 | Smiley | 241/73 X |
| 3,927,840 | 12/1975 | Nash | 241/194 X |
| 3,993,256 | 11/1976 | Brewer | 241/194 X |

*Primary Examiner*—Richard B. Lazarus
*Attorney, Agent, or Firm*—Cox & Smith Incorporated

[57] ABSTRACT

A grinder apparatus for destroying disposable hypodermic syringes, needles, and the like having a feeder valve for delivering varying sized objects to a grinder which has a plurality of flexibly connected grinding means attached to a rotating shaft and an arcuate screen cooperating with the grinding means to facilitate comminuting of articles supplied by the feeder means.

6 Claims, 3 Drawing Figures

DESTRUCTIVE DEVICE

BACKGROUND OF THE INVENTION

This invention relates generally to waste disposing apparatus and more specifically to a grinder apparatus for destroying disposable hypodermic syringes, needles and the like.

It has become a practice among hospitals and physicians to use disposable medical devices, including hypodermic syringes with needles attached, scalpels, razors, medication bottles, suture needles, and other disposable materials. Numerous laws and regulations presently exist which require the destruction of contaminated medical articles generated from hospital operating, labor and delivery rooms and general patient care areas. Numerous devices have been proposed for destroying such tiems. Known U.S. patents relating to destructive devices are as follows: U.S. Pat. Nos. 3,630,458; 3,750,966; 3,926,379; 3,929,295; 3,958,785.

Contaminated disposable materials must be destroyed in a safe manner, so as to avoid infections from the waste materials and to avoid injury to workers utilizing the destructive device. It is the object of the present invention to provide a device which will readily destroy contaminated disposable materials by rendering them completely unusable. It is a further object to provide a device which will be safe for employees to use and minimize the amount of handling of contaminated materials by employees. It is a further object of the invention to provide a device that will destroy contaminated materials of varying sizes without any additional handling or sorting by employees to avoid the risk of infection or injury to employees.

SUMMARY OF THE INVENTION

A grinder apparatus for destroying disposable hypodermic syringes, needles and the like, having a feed chamber with a rotary valve for selectively supplying contaminated materials to a grinding chamber. The rotary valve includes a rotary feed member with spring biased gates, biased into engagement with the rotary feed member. The grinding chamber includes a rotary drive shaft with grinding means attached thereto through flexible connectors to allow flexing of the grinding means upon striking large objects to be comminuted. An arcuate screen is positioned adjacent the distal ends of the flexible grinding means to allow passage therethrough of comminuted articles.

BRIEF DESCRIPTION OF THE PREFERRED EMBODIMENT

Figure 1:
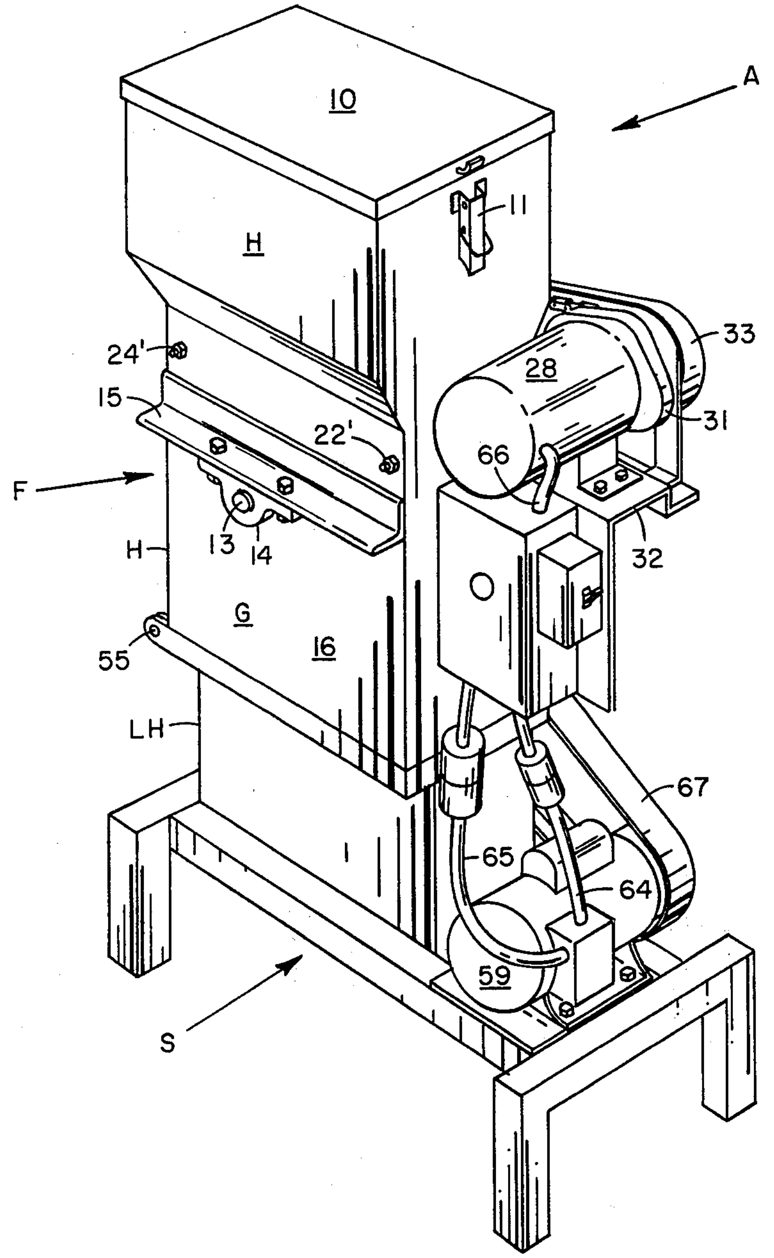
FIG. 1 is a perspective view of the grinder apparatus of the invention.

Referring to FIG. 1 of the drawings, there is shown a grinding apparatus A. The grinding apparatus includes a hooper H for supplying contaminated articles to a feeder valve means F. The feeder valve means F supplies contaminated articles to the grinding means G. A support frame S is provided for supporting the grinding apparatus A.

Figure 2:
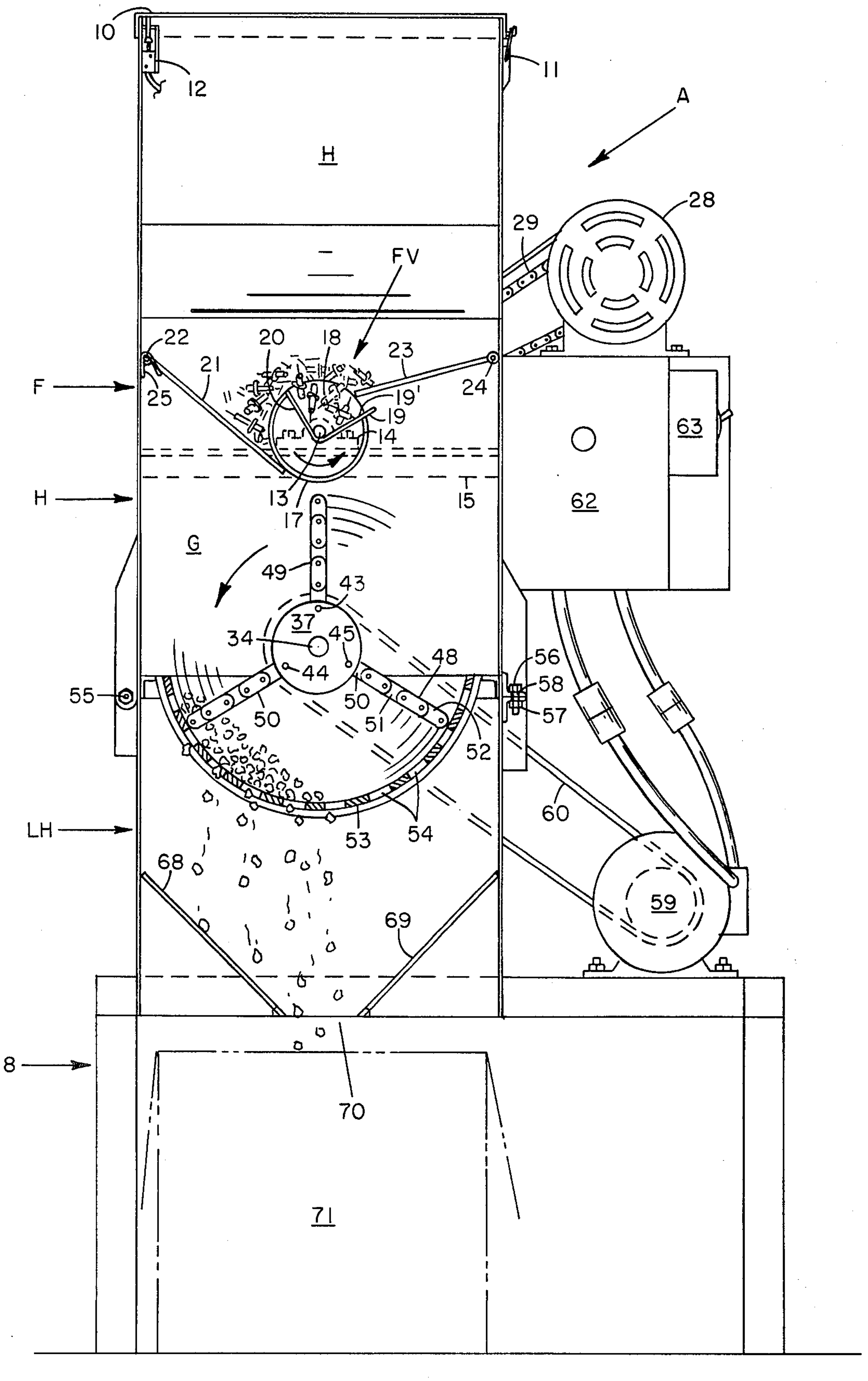
FIG. 2 is a side view partially in section of the grinding apparatus.

The hopper H includes a box-like structure having a top 10 at its upper end. The top 10 is mounted by hinges (not shown) to the hopper H and includes a latch 11 for securing it in the closed position as shown in FIGS. 1 and 2. A switch 12 is provided to prevent operation of the feeder valve means and grinding means when the top 10 is in the open position for safety purposes.

The feeder valve means F includes a shaft 13 mounted for rotation in bearing blocks 14. The bearing blocks 14 are secured to angle members 15, which are secured to the housing 16 of the grinding apparatus. Secured to the shaft 13 is a generally cylindrical member 17 which includes an axially extending open portion 18. The axially extending open portion is formed by two plates 19 and 20 which are secured with the cylindrical member 17 and shaft 13. As best shown in FIG. 2, disposable materials may be collected in the axially extending portion 18 for depositing in the grinding means G. A first pivoted gate 21 is secured to the housing H through a pivot axis 22. A second gate 23 is secured to the housing H through a second pivot axis 24. Nuts 22' and 24' secure the ends of the pivot axes 22 and 24, respectively, with the hopper H. Springs 25 bias the gate 21 into engagement with the feeder valve generally designated FV. As best shown in FIG. 2, rotation of the feeder valve FV will allow contaminated articles to accumulate in the axially extending open portion 18. Secured at opposite ends of the cylindrical member 17 are discs 26 and 27 which engage the gates 21 and 23. As the axially extending open portion 18 passes the gate 21, it will allow the contaminated materials in the axially extending open portion to gradually drop to the grinding means G. As best shown in FIG. 2, the plate 19 extends past the radius of the cylindrical member 17 so that it will cause the gate 23 to rotate upwardly as the extended portion 19' engages the gate 23. The upward movement of the gate 23 will facilitate movement of contaminated articles in the hopper H so as to facilitate unjamming of articles in the hopper so as to maintain a flow of contaminated articles to the axially extending open portion 18. The extended portion 19' will also rotate the gate 21 downwardly which further facilitates unjamming of articles in the hopper. Downward movement of the gate 21 will allow the feeding of large size articles into the grinding means G. The spring 25 maintains the gates 21 and 23 in engagement with the discs 26 and 27 except when engaged by the extended portion 19'. This prevents articles being cummunuted by the grinding means G from flying upwardly into the hopper.

An electric motor 28 is provided to rotate the shaft 13 through chain drive 29. The chain drive 29 is driven by a gear (not shown) on the motor 28 and a gear 30 on the shaft 13. A suitable reduction gear means 31 is provided so as to allow rotation of the shaft 13 at about 60 r.p.m. to drop materials into the grinding means which forms the destruct-chamber. The motor 28 is mounted on a support 32 which is secured to the housing H. A suitable shield 33 is provided to protect operators from the chain and gear drive.

Figure 3:
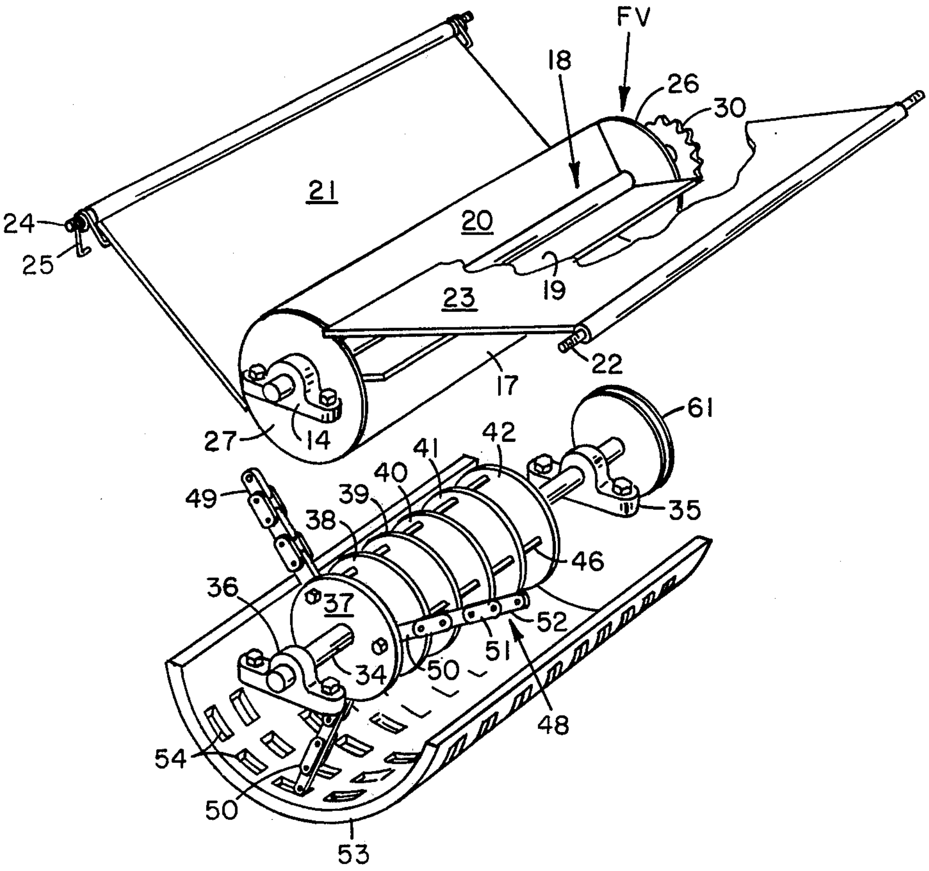
FIG. 3 is a partial view of the feeder means and grinding means.

The grinding means G includes a shaft 34 rotatably mounted in bearing blocks 35 and 36 which are secured to brackets (not shown) inside the housing H. A plurality of discs 37, 38, 39, 40, 41 and 42 are secured for rotation with the shaft 34. The disc 37 as shown in FIG. 2 includes three equally spaced apart apertures which are aligned with the apertures 43, 44 and 45 in the disc 37. Accordingly, a bolt 46 may be inserted into a series of apertures in the disc for rotatably mounting flexible grinding members about the periphery of the disc. Also shown in FIG. 3 is an additional bolt 47 which also secures the flexible grinding members to the discs 37 through 42. The discs and mounting bolts allow the positioning of three rows of five flexible grinding members about the periphery of the discs 37 through 42. The configuration of the grinding members is best shown in FIG. 2, which shows grinding members 48, 49 and 50.

The grinding members 48, 49 and 50 comprise chain links. Each grinding member includes a connecting link, such as at 50, a flexible connection portion 51 and a distal end 52. Each of the grinding members includes the connector, flexible portion and distal end, althoguh only one is described in detail as each is identical.

Mounted adjacent the grinding means G is an arcuate screen 53 which is secured to the lower housing LH. The arcuate screen is formed of a metal plate perforated with holes 54 for passing of comminuted materials therethrough. The housing H is secured to the lower housing LH by a pivot axis 55. A flange 56 is secured to the housing H and another flange 57 is secured to the lower housing LH and abut as shown in FIG. 2 when the upper housing is in the positions for operation. Suitable apertures may be provided through the flanges for positioning of bolts 58 (one of which is shown) in FIG. 2. As will be apparent, the housing H may be pivoted away from the grinding means G upon removal of the bolts 58 to allow access for repair or maintenance of the arcuate screen 53 grinding means.

The shaft 34 is driven by a motor 59 and a belt drive 60. A pulley 61 is mounted on the shaft 34 and connects with the belt drive 60 for rotating of the shaft 34 by the motor 59. The motor 59 is secured to the support frame S. A suitable electric outlet box 62 is provided for providing power to the motors 28 and 59. A switch 63 controls the motors 28 and 59. Suitable electric power supply cords 64, 65 and 66 supply electrical current to drive the motors 28 and 59. A shield 67 is provided to shield operators from the belt drive 60.

Suitable circuitry is provided in the electrical box 62 so that the motor 28 will not operate unless the motor 59 is also operating. In this connection, a single switch is provided which operates both motors.

In operation, an operator releases the latch 11 to raise the top 10 for dumping contaminated articles into the hopper H. After dumping articles into the hopper, the top 10 must then be closed to operate the switch 12 which enables operation of the motors 28 and 59 may then be turned on with the switch 63 to operate the feeder valve means F and grinding means G. As the feeder valve FV rotates, contaminated articles in the axially extending open portion 18 will be fed to the grinding members. When large articles are fed into the grinding means, the grinding members are allowed to flex so as to prevent jamming of articles between the grinding members and the arcuate screen 53 which might jam the entire grinding means. The shaft 34 rotates at about 1700 rpm to provide about 25,500 blows per minute form the three rolls of five grinding members each. As the articles are comminuted, they will be passed through the openings or hole 54 in the arcuate screen 53 and fall on plates 68 and 69 which form an opening 70 for flow of comminuted materials. The plates 68 and 69 are secured to the lower housing LH as best shown in FIG. 2. A box or other container 71 may be positioned below the opening 70 to receive the comminuted materials which have been destroyed. As will be apparent the feeder valve FV will allow various size articles to be fed through the grinding means G and the flexible grinding members will prevent jamming in the case of large articles entering the grinding means. An operator is protected since the flying comminuted pieces from the materials being destroyed cannot get pass the gates 21 and 23 and the top member 10. Since the feeder valve FV will accept various size materials, it is not necessary for an operator to sort out the materials according to their various shapes and sizes but rather many different size materials may be dumped into the hopper H at one time for selective feeding into the grinding means for destruction.

While there has been shown and described a preferred embodiment of a Destructive Device in accordance with the invention, it will be appreciated that many changes and modifications may be made therein without, however, departing from the essential spirit of the invention within the scope of the claims.

We claim:

1. A destructive grinder apparatus of varying size for destroying contaminated articles such as disposable hypodermic syringes, needles and the like, comprising:

a rotary shaft means having a plurality of flexible grinding means having distal ends circumferentially secured thereto by flexible portions for rotation therewith;

an arcuate screen adjacent to the distal ends of the flexible grinding members for allowing passage there through of contaminated disposable hypodermic syringes, needles and the like;

a hopper positioned above the grinding means and having a rotatably mounted valve member for receiving and selectively feeding varying size contaminated articles to the grinding means;

the valve member having a cylindrical outer surface portion and an inwardly recessed feed portion for receiving a predetermined amount of objects for feeding to the grinding means;

the inwardly recessed feed portion including first and second converging walls forming a generally V-shaped recess in the valve member;

a first gate member forming a portion of the bottom of the hopper and engaging the rotatably mounted valve member above its axis of rotation to prevent materials from being fed from the hopper to the grinding means and movable upwardly in response to rotation of the valve member after release of articles by the valve member into the grinding means to provide movement of contaminated articles in the hopper to facilitate, unjamming of the contaminated articles as they are being received by the valve member for release into the grinding means; and a second gate member forming another portion of the bottom of the hopper and engaging the rotatably mounted valve member below the axis of rotation and movable downwardly in response to rotation of the valve member during release of articles by the valve member into the grinding means to allow the valve member to feed large size articles into the grinding means.

2. The apparatus as set forth in claim 1, wherein:

the flexible connectors are formed from a plurality of flexible links.

3. The apparatus as set forth in claim 2, wherein:

the links are connected by pivot axes parallel to the axis of the rotary shaft means.

4. The apparatus as set forth in claim 3, wherein: the flexible links are chain-type links.

5. The apparatus as set forth in claim 1, wherein: the second gate member includes biasing means for maintaining the second gate member in contact with the feeding means.

6. The apparatus as set forth in claim 1; wherein: said second wall extends outwardly beyond the cylindrical surface to pivot the first gate upwardly to facilitate dejamming of contaminated articles in the hopper when the articles are being received by the inwardly recessed feed portion and to pivot the second gate downwardly during release of articles from the inwardly recessed feed portion into the grinding means to allow the valve member to feed large size articles into the grinding means without jamming articles in the hopper.

* * * * *